United States Patent
Fitzgerald et al.

(10) Patent No.: US 12,026,086 B2
(45) Date of Patent: Jul. 2, 2024

(54) DEBUGGING OPERATOR ERRORS IN A DISTRIBUTED COMPUTING ENVIRONMENT

(71) Applicant: RED HAT, INC., Raleigh, NC (US)

(72) Inventors: Laura Fitzgerald, Waterford (IE); Leigh Griffin, Waterford (IE)

(73) Assignee: RED HAT, INC., Raleigh, NC (US)

( * ) Notice: Subject to any disclaimer, the term of this patent is extended or adjusted under 35 U.S.C. 154(b) by 101 days.

(21) Appl. No.: 17/851,521

(22) Filed: Jun. 28, 2022

(65) Prior Publication Data

US 2023/0418729 A1    Dec. 28, 2023

(51) Int. Cl.
  *G06F 11/36* (2006.01)
  *G06F 8/33* (2018.01)

(52) U.S. Cl.
  CPC .......... *G06F 11/3664* (2013.01); *G06F 8/33* (2013.01); *G06F 11/362* (2013.01)

(58) Field of Classification Search
  CPC ....... G06F 11/3664; G06F 8/33; G06F 11/362
  USPC .................................................. 717/120–178
  See application file for complete search history.

(56) References Cited

U.S. PATENT DOCUMENTS

| | | | | |
|---|---|---|---|---|
| 6,339,832 B1 * | 1/2002 | Bowman-Amuah | ... | G06F 9/542 710/48 |
| 7,444,263 B2 * | 10/2008 | White | ..... | H04L 43/16 700/51 |
| 7,702,966 B2 * | 4/2010 | Chandwani | ......... | G06F 11/0793 714/47.1 |
| 8,862,728 B2 * | 10/2014 | Jayachandran | ..... | H04L 41/0613 709/224 |
| 9,329,909 B1 * | 5/2016 | Khanna | ............... | H04L 67/1029 |
| 11,762,858 B2 * | 9/2023 | Damodaran | ....... | G06F 16/24558 707/769 |
| 2021/0149769 A1 | 5/2021 | Balcha et al. | | |
| 2021/0263714 A1 * | 8/2021 | Mazurskiy | ................ | G06F 8/36 |
| 2021/0294805 A1 * | 9/2021 | Damodaran | ....... | G06F 16/24558 |
| 2022/0156102 A1 | 5/2022 | Bandarupalli et al. | | |

OTHER PUBLICATIONS

Neves, Francisco, and Nuno Machado. "Falcon: A practical log-based analysis tool for distributed systems." 2018 48th Annual IEEE/IFIP International Conference on Dependable Systems and Networks (DSN). IEEE, 2018. pp. 534-541 (Year: 2018).*

(Continued)

*Primary Examiner* — Satish Rampuria
(74) *Attorney, Agent, or Firm* — Kilpatrick Townsend & Stockton LLP

(57) ABSTRACT

Some examples described herein relate to debugging operator errors in a distributed computing environment. In one example, a system can identify a custom resource managed by an operator in a distributed computing environment. Based on identifying the custom resource, the system can initiate a monitoring process involving detecting events associated with the custom resource. In response to detecting the events, the system can generate log data indicating one or more operations performed by the operator to trigger the events. The system can then store the log data in a debugging log for use in detecting a functional error related to the operator.

20 Claims, 5 Drawing Sheets

(56) References Cited

OTHER PUBLICATIONS

Stott, David T., et al. "NFTAPE: a framework for assessing dependability in distributed systems with lightweight fault injectors." Proceedings IEEE International Computer Performance and Dependability Symposium. IPDS 2000. IEEE, 2000. pp. 1-10 (Year: 2000).*

Layman, Lucas, et al. "Debugging revisited: Toward understanding the debugging needs of contemporary software developers." 2013 ACM/IEEE international symposium on empirical software engineering and measurement. IEEE, 2013. pp. 383-392 (Year: 2013).*

Mayer, Wolfgang, and Markus Stumptner. "Evaluating models for model-based debugging." 2008 23rd IEEE/ACM International Conference on Automated Software Engineering. IEEE, 2008.pp. 128-137 (Year: 2008).*

Salvaneschi, Guido, and Mira Mezini. "Debugging for reactive programming." Proceedings of the 38th International Conference on Software Engineering. 2016.pp.796-807 (Year: 2016).*

Chitil, Olaf. "Compositional explanation of types and algorithmic debugging of type errors." Proceedings of the sixth ACM SIGPLAN international conference on Functional programming. 2001.pp. 193-204 (Year: 2001).*

Laskawiec et al., "Intelligent operator: Machine learning based decision support and explainer for human operators and service providers in the fog, cloud and edge networks", Journal of Information Security and Applications, 56 (2021) Dec. 24, 2020; pp. 1-11.

Kitahara et al., "Highly-Scalable Container Integrity Monitoring for Large-Scale Kubernetes Cluster", 2020 IEEE International Conference on Big Data (Big Data), 2020; pp. 449-454.

Watanabe et al., "K8s Integrity Shield (tech-preview): Protecting the Integrity of Kubernetes Resources with Signature", Red Hat, Inc., https://cloud.redhat.com/blog/k8s_integrity-shield-tech-preview-protecting-the-integrity-of-kubernetes-resources-with-signature, Mar. 15, 2021; pp. 1-7.

"Red Hat OpenShift on AWS", Amazon Web Services, Inc., https://aws.amazon.com/quickstart/architecture/openshift, 2022; pp. 1-2.

* cited by examiner

```
apiVersion: apiextensions.k8s.io/v1
kind: CustomResourceDefinition
metadata:
  name: crontabs.stable.example.com
  child: CustomResource_X
  parent: CustomResource_Y
spec:
  # group name to use for REST API: /apis/<group>/<version>
  group: stable.example.com
  # list of versions supported by this CustomResourceDefinition
  versions:
    - name: v1
      # Each version can be enabled/disabled by Served flag.
      served: true
      # One and only one version must be marked as the storage version.
      storage: true
      schema:
        openAPIV3Schema:
          type: object
          properties:
            spec:
              type: object
              properties:
                cronSpec:
                  type: string
                image:
                  type: string
                replicas:
                  type: integer
  # either Namespaced or Cluster
  scope: Namespaced
  names:
    # plural name to be used in the URL: /apis/<group>/<version>/<plural>
    plural: crontabs
    # singular name to be used as an alias on the CLI and for display
    singular: crontab
    kind: CronTab
```

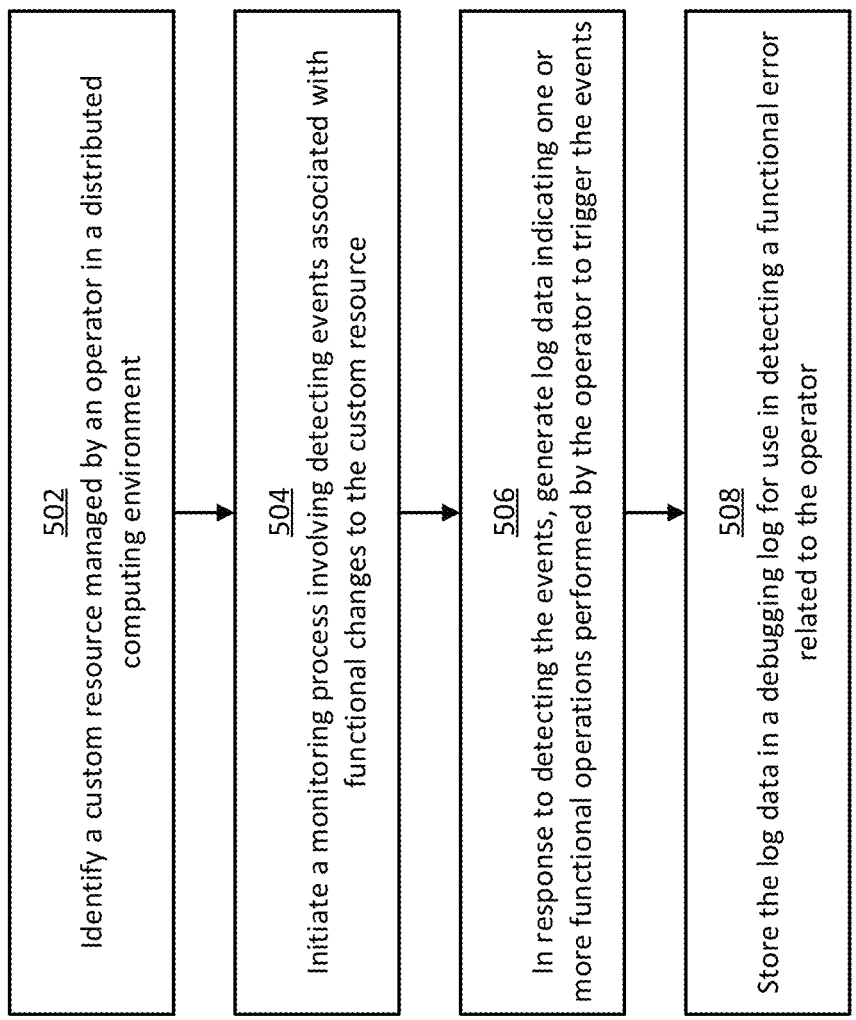

DEBUGGING OPERATOR ERRORS IN A DISTRIBUTED COMPUTING ENVIRONMENT

TECHNICAL FIELD

The present disclosure relates generally to distributed computing environments. More specifically, but not by way of limitation, this disclosure relates to debugging operator errors in a distributed computing environment.

BACKGROUND

A distributed computing environment can include networked nodes (e.g., physical or virtual machines) that can coordinate their actions by passing messages to one another. Because distributed computing environments can be complex, it has become increasingly common for them to include automation software to automate various repeatable tasks. One example of automation software is a container orchestration platform. A container orchestration platform can automate the deployment, scaling, and management of software components (e.g., applications and microservices) inside containers to reduce the workloads of users.

Kubernetes is one popular container orchestration platform that can be deployed in a distributed computing environment. Distributed computing environments that run Kubernetes may be referred to as Kubernetes environments. Kubernetes environments can include operators and other controller software for automating various repeatable tasks, such as deployment and scaling of objects. In the context of Kubernetes, an operator is a software extension that can manage said objects. Once deployed, operators can manage (e.g., create, configure, and update) instances of their assigned objects on behalf of a user in a declarative way. For example, an operator can monitor the state of an assigned object and perform one or more reconciliation operations in response to detecting a state change in the object.

As noted above, Kubernetes operators can be used to monitor and manage objects deployed in the Kubernetes environment. Such objects can be deployed from definition files having configuration data that specifies their characteristics. The objects can configured to be interacted with by providing commands to an API (e.g., the Kubernetes API). In Kubernetes, the objects can be stored as data objects in a database and represent running processes. For example, a Pod object can be a data object that is stored in a database internal to Kubernetes and represents a running pod in the Kubernetes environment.

While many types of objects are available for deployment in Kubernetes by default, it may be desirable to add custom objects in some situations. Such custom objects are referred to as "custom resources" in Kubernetes parlance. A custom resource is a special type of object that is generally unavailable in Kubernetes by default and that has one or more characteristics specified in a custom definition file, which is known as a custom resource definition (CRD). Such custom resource definitions and custom resources can be subsequently added to a Kubernetes installation, for example to extend the Kubernetes API.

BRIEF DESCRIPTION OF THE DRAWINGS

FIG. 2 shows an example of a custom resource definition according to some aspects of the present disclosure.

FIG. 5 is a flow chart of an example of a process associated with debugging operator errors according to some aspects of the present disclosure.

DETAILED DESCRIPTION

Figure 1:
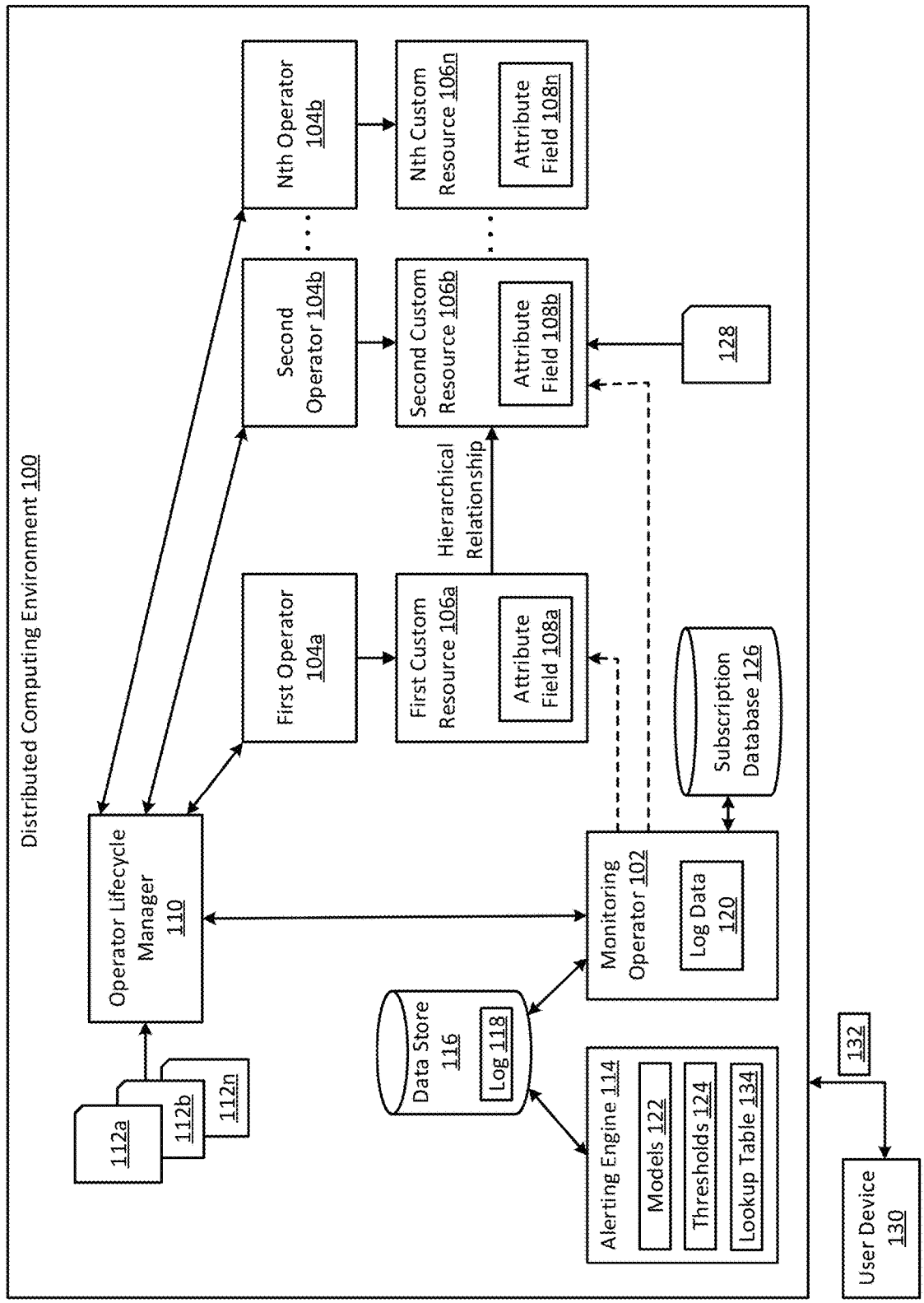
FIG. 1 shows a block diagram of an example of a distributed computing environment with a monitoring operator according to some aspects of the present disclosure.

Some distributed computing environments may have dozens or hundreds of operators that may concurrently manage and modify objects deployed therein. The operators can modify the characteristics of the objects in response numerous different types of events. In some cases, multiple operators may modify the same object in response to the same types of events or different types of events. The large number of operators and object modifications can make it challenging to track how the distributed computing environment changed over time to arrive at its current operational state. As a result, it can be challenging to debug operational problems occurring in the distributed computing environment, for example to understand which operators and object modifications produced an error (e.g., a bug or failure). This difficulty is compounded by the fact that some operators and objects can depend on other operators and objects, producing a highly complex and interwoven arrangement in which an error in an upstream component can have cascading effects on downstream components. These cascading effects can obfuscate the original source of the problem, making it more challenging to debug.

Some examples of the present disclosure can overcome one or more of the abovementioned problems by providing a monitoring operator that can monitor an object in a distributed computing environment and detect events related to the monitored object. A monitoring operator can be a special type of operator that is configured to monitor objects for events. Since the object may be managed by a corresponding operator in the distributed computing environment, upon detecting the event corresponding to the object, the monitoring operator can determine one or more functions performed by the corresponding operator to trigger the event. The monitoring operator can then generate a log describing the event and function performed by the operator. The monitoring operator may perform (e.g., concurrently) this monitoring and logging for any number of objects in the distributed computing environment. In some examples, the monitoring operator can identify hierarchical relationships between objects in the distributed computing environment and monitor some or all of the objects in the hierarchy. Such monitoring may allow for a detailed account of operator functions and object modifications to be tracked over time, even in highly complex scenarios with many interrelationships among objects, so that it is easier to understand how the distributed computing environment arrived at its current state. The logs may not only significantly simplify and expedite the process of debugging problems in the distributed computing environment, but may allow debugging to be performed in some situations where it is currently impractical or impossible.

Some examples may also include an alerting engine that can automatically analyze the logs to identify anomalies associated with the objects and their operators. An anomaly may be something that deviates from what is standard, normal, or expected. Such anomalies may indicative of a current problem or a future problem in the distributed computing environment. Some anomalies may involve an operator or an object behaving in an abnormal manner. Other anomalies may involve an abnormal event (or an abnormal pattern of events) occurring with respect to one or more operators or objects in the distributed computing environment. In response to detecting an anomaly, the alerting engine can notify an administrator about the anomaly. Such notifications may allow the administrator to take steps to prevent or mitigate corresponding problems in the distributed computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a distributed computing environment 100 according to some aspects of the present disclosure. Examples of the distributed computing environment 100 can include a cloud computing system, a computing cluster, and a data grid. The distributed computing environment 100 can include any number and combination of nodes in networked communication with one another. The nodes may execute software services for use in satisfying client requests, such as requests transmitted to the distributed computing environment 100 from client devices located outside the distributed computing environment 100. In some examples, the software services may be executed within containers and virtual machines. This may help isolate the software services from one another and improve the security of the distributed computing environment 100. In some examples, the distributed computing environment 100 may include Kubernetes to help automate the management of the containers and other objects in the distributed computing environment 100.

The distributed computing environment 100 can include an operator lifecycle manager 110. The operator lifecycle manager 110 can manage the lifecycle of operators 104a-n in the distributed computing environment 100. For example, the operator lifecycle manager 110 can deploy, manage, and shutdown operators 104a-n in the distributed computing environment 100. The operator lifecycle manager 110 is separate from the operators and may include a user interface for enabling a user to control which operators are deployed and customize parameters associated with the operators. The operator lifecycle manager 110 can deploy the operators 104a-n based on definition files 112a-n, which can include configuration data that specifies the features and functionality of the operators 104a-n. For example, the operator lifecycle manager 110 can ingest the definition file 112a and use the configuration data therein to deploy and configure a first operator 104a in the distributed computing environment 100. The operator lifecycle manager 110 can also ingest the definition file 112b and use the configuration data therein to deploy and configure a second operator 104b in the distributed computing environment 100. And so on.

The operators 104a-n can monitor and manage (e.g., deploy, update, and shutdown) corresponding objects in the distributed computing environment 100. Each of the operators 104a-n can monitor and manage at least one corresponding object. In Kubernetes, the objects can be stored as data objects in a database and can represent running processes. For example, a Statefulset object can be a data object that is stored in a database internal to Kubernetes and represents a stateful application that is running in the distributed computing environment 100. Once deployed, objects can have parameters that can be adjusted by their corresponding operators.

In some examples, the operators 104a-n can be responsible for deploying their corresponding objects. For example, the first operator 104a can instantiate a first custom resource 106a in the distributed computing environment 100. The second operator 104b can instantiate a second custom resource 106b in the distributed computing environment 100. And so on. Other components of the distributed computing environment 100 may also deploy the objects.

The objects can be deployed and configured based on corresponding definition files. The definition files can include configuration data that specifies the features and functionality of the objects. For example, the second operator 104b can ingest a definition file 128 and use the configuration data therein to deploy and configure the second custom resource 106b in the distributed computing environment 100.

Some operators and objects can have hierarchical relationships with respect to one another. For example, the first custom resource 106a may depend on the second custom resource 106b to implement certain functionality. This hierarchical (e.g., dependency) relationship may be predesignated in the definition file of one or both of the custom resources. For instance, the definition file 128 may indicate that the second custom resource 106b is a dependency of the first custom resource 106a. One example of such a definition file 128 shown in FIG. 2. Since the definition file 128 corresponds to the second custom resource 106b, it can be considered a custom resource definition. As shown in FIG. 2, the definition file 128 can include a metadata section 202, a specification 204 with configuration data for the second custom resource 106b, a names section 206 with naming designations for the second custom resource 106b, and other sections. The metadata section 202 can describe one or more hierarchical relationships between the second custom resource 106b and other objects, such as a the first custom resource 106a. For example, the metadata section 202 can describe one or more other objects on which the second custom resource 106b depends. Those other objects may be referred to as children of the second custom resource 106b. The metadata section 202 can also describe one or more other objects for which the second custom resource 106b serves as a dependency. Those other objects may be referred to as parents of the second custom resource 106b. One custom resource may depend on one or more other objects, and vice-versa. Similar principles can apply to the operators. For example, the first operator 104a may depend on the second operator 104b to implement certain features or functionality. This hierarchical relationship may be predesignated in the definition file of one or both of the operators. For instance, the definition file 112a may indicate that the first operator 104a depends on the second operator 104b. One operator may depend on one or more other operators, and vice-versa.

The number of the operators and objects in the distributed computing environment 100, and the complexity of their interrelationships, may make it challenging to identify the root cause of errors in the distributed computing environment 100. To help overcome this problem, the distributed computing environment 100 can include a monitoring operator 102 and an alerting engine 114.

The monitoring operator 102 may be deployed in the distributed computing environment 100 by the operator lifecycle manager 110. For example, the operator lifecycle manager 110 can ingest a definition file for the monitoring operator 102 and use the configuration data therein to deploy and configure the monitoring operator 102 in the distributed computing environment 100. Once deployed, the monitoring operator 102 can register certain objects or operators for monitoring. For example, the first custom resource 106a and the second custom resource 106b can be subscribed to be monitored by the monitoring operator 102. The monitoring operator 102 can store this subscription information in a subscription database 126, which may be internal or external to the monitoring operator 102. In some examples, the objects or operators may be automatically subscribed with the monitoring operator 102 upon their deployment. For instance, the monitoring operator 102 can be configured to detect when a particular object or object type is deployed in the distributed computing environment 100 and automatically register the corresponding object for monitoring in the subscription database 126. In other examples, the objects or operators may be selectively subscribed with the monitoring operator 102. For instance, an operator can deploy an object in the distributed computing environment 100 and then transmit a message to the monitoring operator 102 to register the object for monitoring. In response to receiving the message, the monitoring operator 102 can register the object for monitoring in the subscription database 126.

In some examples, the monitoring operator 102 may update attribute fields of monitored objects to indicate that those objects are now being monitored by the monitoring operator 102. For example, the monitoring operator 102 can transmit a command to the first operator 104a. The command can be cause the first operator 104a to update the attribute field 108a of the first custom resource 106a to indicate that the first custom resource 106a is now being monitored by the monitoring operator 102. Likewise, the monitoring operator 102 can transmit a command to the second operator 104b. The command can cause the second operator 104b to update the attribute field 108b of the second custom resource 106b to indicate that the second custom resource 106b is now being monitored by the monitoring operator 102.

After one or more objects or operators are registered for monitoring with the monitoring operator 102, the monitoring operator 102 can monitor those objects or operators for events. For example, the monitoring operator 102 can initiate a monitoring process to monitor the first custom resource 106a and the second custom resource 106b for events. This monitoring process is represented in FIG. 1 by the dashed arrows. An event can include any change to, or interaction involving, an object. The events may triggered by the operators performing various operations. For example, the first operator 104a may update properties of the first custom resource 106a, where such updates may constitute events detectable by the monitoring operator 102. As another example, the second operator 104b may update properties of the second custom resource 106b, where such updates may constitute events detectable by the monitoring operator 102.

In some examples, the monitoring operator 102 can identify one or more hierarchical relationships between multiple objects in the distributed computing environment 100 and responsively initiate monitoring processes for some or all of those objects. For example, the monitoring operator 102 can be instructed to monitor the first custom resource 106a. So, the monitoring operator 102 may initiate a first monitoring process for the first custom resource 106a. As part of the first monitoring process, the monitoring operator 102 may access a definition file for the first custom resource 106a and analyze it. By analyzing the definition file, the monitoring operator 102 may determine that the first custom resource 106 has a hierarchical relationship with (e.g., depends on) the second custom resource 106b. The monitoring operator 102 may alternatively be able to identify this hierarchical relationship using other techniques (e.g., a user may input the hierarchical relationship). Regardless of how the hierarchical relationship is determined, the monitoring operator 102 may initiate a second monitoring process for the second custom resource 106b based on identifying the hierarchical relationship. As part of the second monitoring process, the monitoring operator 102 may access a definition file 128 for the second custom resource 106b and analyze it to identify one or more further hierarchical relationships. And so on. The monitoring operator 102 can perform this type of iterative, recursive analysis to identify a full hierarchical tree and responsively initiate monitoring processes for some or all of the objects in the tree.

To detect events associated with the monitored objects or other operators, the monitoring operator 102 may make use of a message bus or another event detection mechanism. For example, the distributed computing environment 100 may include a message bus. Each time the state of an object changes (e.g., a property of the first custom resource 106a is modified), a message may be transmitted on the message bus to indicate the event. The message may be transmitted by the operator corresponding to the object or by another component of the distributed computing environment 100. For example, the first operator 104a may transmit an event message, on the message bus, corresponding to an event involving a change in the first custom resource 106a. The monitoring operator 102 can monitor the message bus for such event messages and detect the events based on the event messages.

In response to detecting one or more events, the monitoring operator 102 can generate log data 120. The monitoring operator 102 can generate the log data 120 based on information about the events (e.g., event data included in the event messages). The log data 120 may include event details, such as the name of the object associated with the event, the type of the event, the time of the event, an operator associated with the object, an operator function that may have triggered the event, and a user associated with the object. For example, entries in the log data 120 may include the following data fields: {object name, event type, timestamp, operator name, operator function, user name}. One particular example of such an entry may be {custom_resource_1, update parameter_A from value_1 to value_2, June 9 2022 at 13:37:06, operator_1, admin_1}. More or fewer event details may be included in the log data 120 in other examples. Incorporating the operator name and function into the log data 120 can help with identifying the root cause of a bug in the distributed computing environment 100. The monitoring operator 102 may communicate with the other operator, for example in response to detecting an event associated with a corresponding object, to determine which function was performed by the operator to produce the event. After generating the log data 120, the monitoring operator 102 can store the log data 120 in a data store 116. For example, the monitoring operator 102 can store the log data 120 as part of a debugging log 118 in the data store 116.

As noted above, the distributed computing environment 100 can also include an alerting engine 114. The alerting engine 114 can analyze the log data 120 (e.g., in the debugging log 118) to detect an anomaly in the distributed computing environment 100. For example, the alerting engine 114 can analyze the log data 120 to detect an anomaly associated with a particular operator or object in the distributed computing environment 100. In response to detecting an anomaly, the alerting engine 114 can transmit a notification 132 to a user device 130, such as a laptop computer, desktop computer, mobile phone, or tablet. The notification 132 can indicate the detected anomaly. The user device 130 may be operated by a network administrator or another user, who may then take preventative or remedial action in response to receiving the notification 132 about the detected anomaly.

The alerting engine 114 can apply models 112, thresholds 124, or any combination thereof to detect the anomalies. The models 112 can include machine-learning models, such as neural networks, classifiers, support vector machines, and decision trees. The models 112 can be executed to analyze the debugging log 118 to detect an anomaly. The thresholds 124 may include one or more predefined threshold values, against which log data 120 in the debugging log 118 can be compared to identify an anomaly. Detecting and providing notifications of such anomalies may assist a user in identifying factors contributing to (e.g., a root cause of) a problem in the distributed computing environment 100. In some cases, such detection and notifications may preemptively warn a user about a potential problem before it occurs, thereby allowing the user to prevent the problem altogether. Thus, some examples described herein may be applied to prevent problems and improve post-hoc remediation.

The alerting engine 114 can detect anomalies associated with the operators and objects (e.g., custom resources 106a-n) using any number and combination of techniques. For example, the alerting engine 114 can detect an anomaly in response to determining that one or more values in the debugging log 118 meet or exceed a predefined threshold 124. The threshold 124 may be predefined in the alerting engine 114 or may be predefined in a definition file for an operator or object. For instance, the alerting engine 114 can detect an anomaly associated with the second custom resource 106b based on determining that a value associated with the second custom resource 106b in the debugging log 118 exceeds a threshold 124 defined in the definition file 128. By defining the threshold in a definition file for an operator or object, a creator of the operator or object may be able to specify the appropriate thresholds or other users may be able to customize the thresholds as desired. In some examples, the thresholds 124 may be dynamically adjusted over time as historical data is gathered and analyzed by the alerting engine 114. For example, the alerting engine 114 can analyze the debugging log 118 and other historical information using a model 122 and automatically adjust one or more of the thresholds 124 accordingly. This may allow for dynamic thresholds that can be customized based on the operation of the distributed computing environment 100.

In some examples, the alerting engine 114 can detect an anomaly in response to determining that a pattern of values in the debugging log 118 matches a predefined pattern of values indicative of the anomaly. For example, the alerting engine 114 can compare a pattern of values in the debugging log 118 to predefined patterns of values associated with anomalies in a lookup table 134. Such predefined patterns can be referred to as reference patterns. By performing this comparison, the alerting engine 114 can identify any matches to the reference patterns (e.g., taking into account a range of tolerance). In some examples, the reference patterns may be dynamically adjusted over time as historical data is gathered and analyzed by the alerting engine 114. For example, the alerting engine 114 can analyze the debugging log 118 and other historical information using a model 122 and automatically adjust one or more of the reference patterns accordingly. This may allow for dynamic pattern matching that can be customized based on the operation of the distributed computing environment 100.

In some examples, the alerting engine 114 can detect an anomaly in response to determining that a first pattern of events occurring during a first time period is different from a second pattern of events occurring during a second time period, the second time period being different from the first time period. For example, the alerting engine 114 can analyze the debugging log 118 to identify a first pattern of events occurring during a first time period. The alerting engine 114 can analyze the debugging log 118 to identify a second pattern of events occurring during a second time period, the second time period being different from the first time period. The alerting engine 114 can then compare the first pattern of events to the second pattern of events and, if they are sufficiently different (e.g., taking into account a range of tolerance), determine that an anomaly occurred.

In some examples, the alerting engine 114 can detect an anomaly in response to determining that a first frequency at which an event occurred during a first time period is different from a second frequency at which the event occurred during a second time period. For example, the alerting engine 114 can analyze the debugging log 118 to identify a first frequency at which an event occurring during a first time period. The alerting engine 114 can analyze the debugging log 118 to identify a second frequency at which an event occurred during a second time period, the second time period being different from the first time period. The alerting engine 114 can then compare the first frequency to the second frequency and, if they are sufficiently different (e.g., taking into account a range of tolerance), determine that an anomaly occurred. In other examples, the alerting engine 114 can compare the first frequency or the second frequency to a predefined threshold 124. If the first frequency or the second frequency meets or exceeds the predefined threshold 124, the alerting engine 114 may detect an anomaly.

Using the above process, the monitoring operator 102 can automatically monitor objects and log associated events in a debugging log 118. The debugging log 118 can then be used by the alerting engine 114 to automatically identify anomalies in the distributed computing environment 100. Identifying such anomalies can, in turn, help avoid or remediate problems in the distributed computing environment 100.

Figure 3:
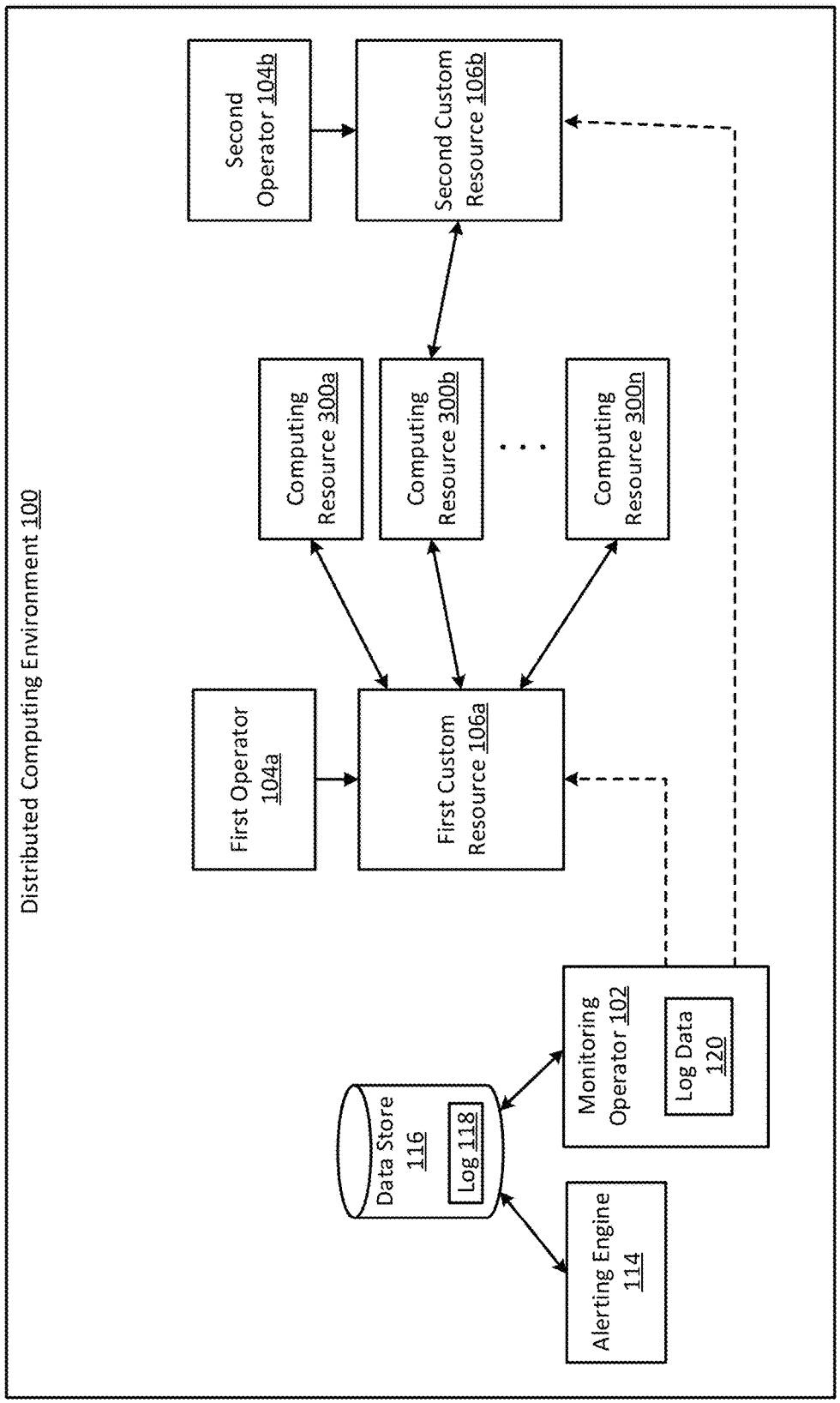
FIG. 3 shows a block diagram of an example of a distributed computing environment in which a custom resource is interacting with computing resources according to some aspects of the present disclosure.

Some objects in the distributed computing environment 100 may rely on one or more computing resources to implement certain functionality. Examples of such computing resources can include processors, memory, and storage volumes. One example such an arrangement is shown in FIG. 3. As shown, the first custom resource 106a depends on computing resources 300a-n. The second custom resource also depends on computing resource 300b, which may be for example a particular storage volume. The allocation of a computing resource to an object may constitute an event that can be detected by the monitoring operator 102 and incorporated into the log data 120. Computing resources may be allocated to an object before or after deployment of the object. An interaction between an object and a computing resource may also constitute an event that can be detected by the monitoring operator 102 and incorporated into the log data 120. For example, if an object writes data to a storage volume or reads data from the storage volume, those events may be detected by the monitoring operator 102 and incorporated into the log data 120.

The dependency relationship between an object and a computing resource may be predesignated in the definition file of the object. For instance, the definition file 128 may indicate that the second custom resource 106*b* requires a certain computing resource, such as a storage volume, to implement its functionality. Upon initiating a monitoring process for the second custom resource 106*b*, the monitoring operator 102 may analyze the definition file 128 to determine that the second custom resource 106*b* depends on the computing resource 300*b*. Based on determining that the second custom resource 106*b* depends on the computing resource 300*b*, the monitoring operator 102 can monitor for events involving the second custom resource 106*b* and computing resource 300*b*. In other examples, the dependency relationships between an object and one or more computing resources may be identified by the monitoring operator 102 using other techniques, for example based on user input. Regardless of how the dependency relationships are identified, the monitoring operator 102 can monitor for and log events involving the object and the corresponding computing resources.

Although some examples are described above with respect to a Kubernetes environment that has operators managing custom resources, the principles described herein are not limited to such an arrangement. A similar arrangement can be implemented using another type of controller software other than operators, to manage custom resources or other types of objects, in a distributed computing environment that may or may not be running Kubernetes. These and other types of arrangements of controller software and objects are contemplated within the scope of this disclosure.

Figure 4:
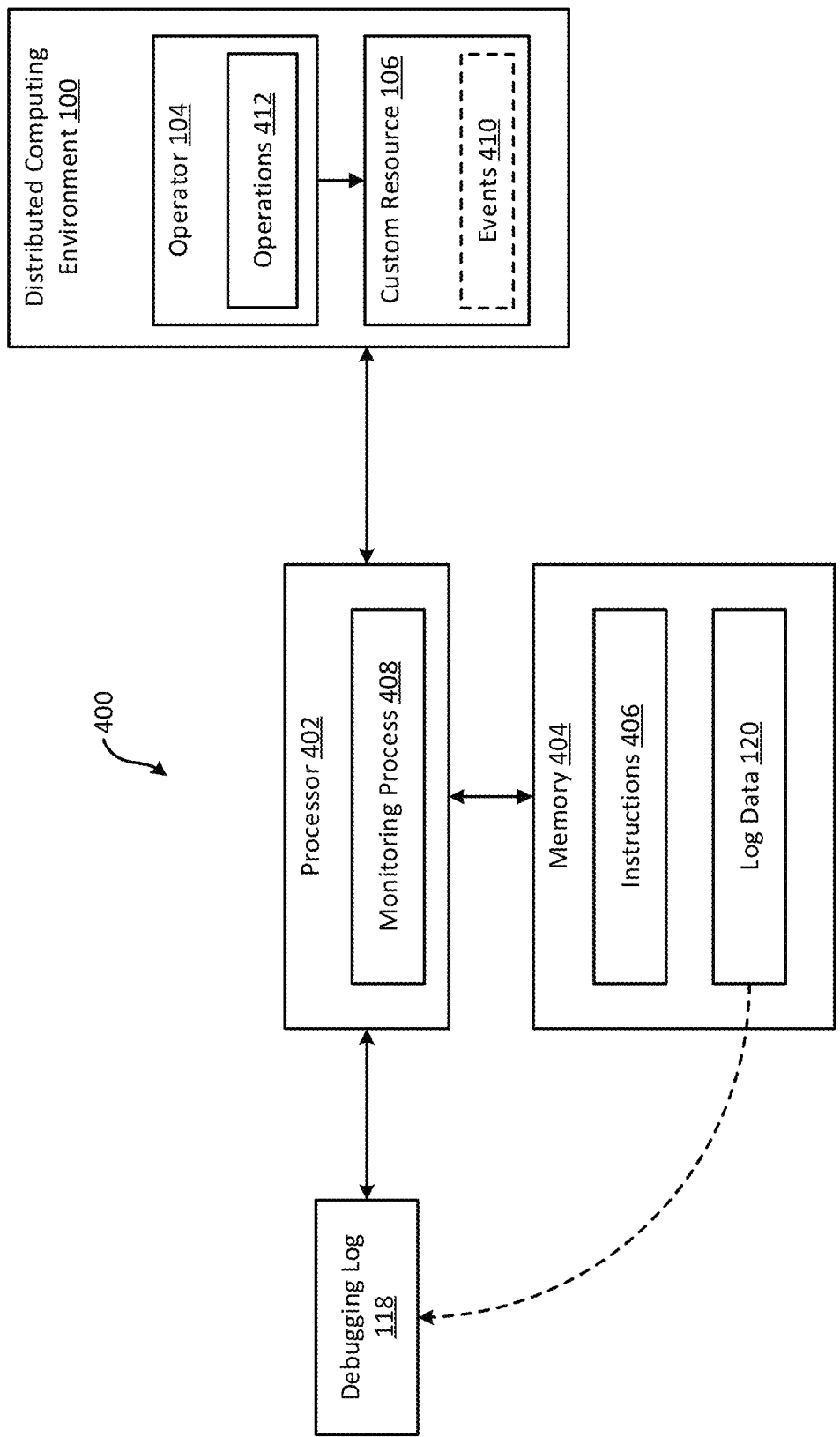
FIG. 4 shows a block diagram of an example of a system usable to debug operator errors according to some aspects of the present disclosure.

FIG. 4 shows a block diagram of an example of a system 400 usable to debug operator errors according to some aspects of the present disclosure. The system 400 can include a processor 402 and a memory 404. The processor 402 and memory 404 can be integrated into a single housing or can be distributed from one another.

The processor 402 can include one processor or multiple processors. Non-limiting examples of the processor 402 include a Field-Programmable Gate Array (FPGA), an application-specific integrated circuit (ASIC), or a microprocessor. The processor 402 can execute instructions 406 stored in the memory 404 to perform one or more operations. In some examples, the instructions 406 can include processor-specific instructions generated by a compiler or an interpreter from code written in any suitable computer-programming language, such as C, C++, C#, or Java. In some examples, the instructions 406 can correspond to the monitoring operator 102 and/or the alerting engine 114 of FIG. 1.

The memory 404 can include one memory device or multiple memory devices. The memory 404 can be volatile or non-volatile, in that the memory 404 can retain stored information when powered off. Non-limiting examples of the memory 404 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 402 with the instructions 406 or other program code. Non-limiting examples of a computer-readable medium include magnetic disks, memory chips, ROM, random-access memory (RAM), an ASIC, a configured processor, optical storage, or any other medium from which a computer processor can read the instructions 406.

The processor 402 can execute the instructions 406 to perform some or all of the functionality described herein, for example the functionality described above with respect to the monitoring operator and the alerting engine. In some examples, the processor 402 can identify a custom resource 106 managed by an operator 104 in a distributed computing environment 100. Based on identifying the custom resource 106, the processor 402 can initiate a monitoring process 408 involving detecting events 410 associated with the custom resource 106. In response to detecting the events 410, the processor 402 can generate log data 120 indicating one or more operations 412 performed by the operator 104 to trigger the events 410. The processor 402 can store the log data 120 in a debugging log 118 for use in detecting a functional error related to the operator 104. The debugging log 118 may be stored in the memory 404 or in another location, which may be internal or external to the distributed computing environment 100.

FIG. 5 is a flow chart of an example of a process associated with debugging operator errors according to some aspects of the present disclosure. Other examples may include more operations, fewer operations, different operations, or a different order of operations than is shown in FIG. 5. The operations of FIG. 5 are described below with reference to the components of FIG. 4 described above.

In block 502, the processor 402 identifies a custom resource 106 managed by an operator 104 in a distributed computing environment 100. This may involve the operator 104 notifying the processor 402 of the custom resource 106 or registering the custom resource 106 in a database (e.g., a subscription database accessible to the processor 402). In some examples, the processor 402 can automatically detect the deployment of the custom resource 106 in the distributed computing environment 100 by monitoring a message bus for a notification about the deployment.

In block 504, the processor 402 initiates a monitoring process 408 involving detecting events 410 associated with the custom resource 106. The processor 402 can initiate the monitoring process 408 based on identifying the custom resource 106. The monitoring process 408 may involve monitoring a message bus to detect event messages related to the custom resource 106. Additionally or alternatively, the monitoring process 408 may involve communicating with the operator 104 or other components of the distributed computing environment 100 to detect the events 410.

In block 506, the processor 402, in response to detecting the events 410, generates log data 120 indicating one or more operations 412 performed by the operator 104 to trigger the events 410. For example, the processor 402 can communicate with the operator 104 to determine which operations 412 it performed to produce the events 410. Alternatively, the processor 402 can estimate which operation 412 was performed by the operator 104 based on the characteristics (e.g., a type, timestamp, duration, etc.) of an event 410. For example, the processor 402 can determine one or more characteristics of an event 410 by analyzing event data in an event message transmitted in response to the event 410. Based on the one or more characteristics of the event 410, the processor 402 can determine an operation 412 that was likely performed by the operator 104 to trigger the event 410. For instance, if the event involves an object's parameter changing from a first value to a second value, the processor 402 may be able to execute predefined logic to determine that the operator 104 produced the event 410 by performing an update operation configured to modify the object's parameter from the first value to the second value. After determining which operation 412 was performed by the operator 104 to produce the event 410, the processor 402 can generate the log data 120 describing the operation 412.

In block 508, the processor 402 stores the log data 120 in a debugging log 118 for use in detecting a functional error related to the operator 104. The debugging log 118 may be stored in the memory 404 or in any other suitable location.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code for a monitoring operator, wherein the monitoring operator is executable by one or more processors to:
identify a custom resource managed by an operator in a distributed computing environment, wherein the custom resource is deployed in the distributed computing environment, and wherein the operator is software deployed in the distributed computing environment, the operator being different from the monitoring operator;
based on identifying the custom resource, initiate a monitoring process for automatically detecting events involving the custom resource;
in response to automatically detecting the events involving the custom resource:
determine one or more operations performed by the operator to trigger the events; and
generate log data indicating the one or more operations performed by the operator to trigger the events; and
store the log data in a debugging log; and
automatically analyze the debugging log to detect a functional error related to the operator.

2. The non-transitory computer-readable medium of claim 1, further comprising program code that is executable by the one or more processors for causing the one or more processors to:
deploy the operator in the distributed computing environment, the operator being executable to instantiate and monitor the custom resource in the distributed computing environment;
deploy the monitoring operator in the distributed computing environment separately from the operator and the custom resource; and
subscribe the custom resource with the monitoring operator to initiate the monitoring process.

3. The non-transitory computer-readable medium of claim 1, wherein the operator is a first operator, the custom resource is a first custom resource, the monitoring process is a first monitoring process, and further comprising program code that is executable by the one or more processors for causing the one or more processors to:
identify a second custom resource monitored by a second operator in the distributed computing environment;
determine that the second custom resource has a predefined hierarchical relationship with respect to the first custom resource;
based on determining that the second custom resource has the predefined hierarchical relationship with respect to the first custom resource, initiate a second monitoring process for detecting other events resulting in functional changes to the second custom resource;
in response to detecting the other events, generate other log data indicating one or more operations performed by the second operator to trigger the other events; and
store the other log data in the debugging log for use in debugging a functional error related to the second operator.

4. The non-transitory computer-readable medium of claim 3, wherein the predefined hierarchical relationship between the first custom resource and the second custom resource includes a dependency relationship in which the first custom resource depends on the second custom resource.

5. The non-transitory computer-readable medium of claim 3, wherein the predefined hierarchical relationship is defined in a definition file associated with the first custom resource or the second custom resource, and further comprising program code that is executable by the one or more processors for causing the one or more processors to identify the predefined hierarchical relationship by analyzing the definition file.

6. The non-transitory computer-readable medium of claim 5, wherein the definition file includes configuration data for the first custom resource or the second custom resource.

7. The non-transitory computer-readable medium of claim 1, further comprising program code that is executable by the one or more processors for causing the one or more processors to detect an anomaly associated with the operator by analyzing the debugging log.

8. The non-transitory computer-readable medium of claim 1, further comprising program code that is executable by the one or more processors for causing the one or more processors to:
based on initiating the monitoring process, update an attribute field of the custom resource to indicate that the monitoring operator is monitoring the custom resource.

9. The non-transitory computer-readable medium of claim 1, further comprising program code that is executable by the one or more processors for causing the one or more processors to:
determine that a computing resource is associated with the custom resource in the distributed computing environment;
based on determining that the computing resource is associated with the custom resource, detect an event associated with an interaction between the custom resource and the computing resource in the distributed computing environment, the event being one of the events monitored during the monitoring process; and
generate the log data based on the event.

10. The non-transitory computer-readable medium of claim 9, further comprising program code that is executable by the one or more processors for causing the one or more processors to determine that the computing resource is associated with the custom resource by analyzing a definition file for the custom resource, the definition file including configuration data for the custom resource and describing the computing resource.

11. The non-transitory computer-readable medium of claim 1, wherein:
the custom resource is an object in the distributed computing environment;
the operator is deployed by an operator lifecycle manager of the distributed computing environment based on a definition file corresponding to the operator; and
the operator is executable to automatically perform a reconciliation operation in relation to the custom resource.

12. A method comprising:
identifying, by a processor, a custom resource managed by an operator in a distributed computing environment, wherein the custom resource is deployed in the distributed computing environment, and wherein the operator is software deployed in the distributed computing environment;
based on identifying the custom resource, initiating, by the processor, a monitoring process for automatically detecting events involving the custom resource;
in response to automatically detecting the events involving the custom resource:
   determining, by the processor, one or more operations performed by the operator to trigger the events; and
   generating, by the processor, log data indicating the one or more operations performed by the operator to trigger the events; and
storing, by the processor, the log data in a debugging log; and
analyzing the debugging log to detect a functional error related to the operator.

13. The method of claim 12, further comprising:
deploying the operator in the distributed computing environment, the operator being executable to instantiate and monitor the custom resource in the distributed computing environment;
deploying a monitoring operator in the distributed computing environment separately from the operator and the custom resource; and
subscribe the custom resource with the monitoring operator, wherein subscribing the custom resource to the monitoring operator causes the monitoring operator to initiate the monitoring process.

14. The method of claim 12, wherein the operator is a first operator, the custom resource is a first custom resource, the monitoring process is a first monitoring process, and further comprising:
identifying a second custom resource monitored by a second operator in the distributed computing environment;
determining that the second custom resource has a predefined hierarchical relationship with respect to the first custom resource;
based on determining that the second custom resource has the predefined hierarchical relationship with respect to the first custom resource, initiating a second monitoring process for detecting other events resulting in functional changes to the second custom resource;
in response to detecting the other events, generating other log data indicating one or more operations performed by the second operator to trigger the other events; and
storing the other log data in the debugging log for use in debugging a functional error related to the second operator.

15. The method of claim 14, wherein the predefined hierarchical relationship is defined in a definition file associated with the first custom resource or the second custom resource, and further comprising identifying the predefined hierarchical relationship by analyzing the definition file.

16. The method of claim 15, wherein the definition file includes configuration data for the first custom resource or the second custom resource.

17. The method of claim 14, wherein the predefined hierarchical relationship between the first custom resource and the second custom resource includes a dependency relationship in which the first custom resource depends on the second custom resource.

18. The method of claim 12, further comprising detecting an anomaly associated with the operator by analyzing the debugging log.

19. The method of claim 12, further comprising:
determining that a computing resource is associated with the custom resource in the distributed computing environment;
based on determining that the computing resource is associated with the custom resource, detecting an event associated with an interaction between the custom resource and the computing resource in the distributed computing environment, the event being one of the events monitored during the monitoring process; and
generating the log data based on the event.

20. A system comprising:
one or more processors; and
one or more memories including instructions executable by the one or more processors for causing the one or more processors to:
   identify a custom resource managed by an operator in a distributed computing environment, wherein the custom resource is deployed in the distributed computing environment, and wherein the operator is software deployed in the distributed computing environment;
   based on identifying the custom resource, initiate a monitoring process for automatically detecting events involving the custom resource;
   in response to automatically detecting the events involving the custom resource;
      determine one or more operations performed by the operator to trigger the events; and
      generate log data indicating the one or more operations performed by the operator to trigger the events; and
   store the log data in a debugging log for use in detecting a functional error related to the operator.

* * * * *